United States Patent [19]

Fleming, Jr. et al.

[11] 4,302,074
[45] Nov. 24, 1981

[54] ALUMINUM METAPHOSPHATE OPTICAL FIBERS

[75] Inventors: James W. Fleming, Jr., Fanwood; John W. Shiever, Cedar Grove, both of N.J.

[73] Assignee: Bell Telephone Laboratories, Incorporated, Murray Hill, N.J.

[21] Appl. No.: 26,410

[22] Filed: Apr. 2, 1979

[51] Int. Cl.³ ............... C03B 37/075; G02B 5/172
[52] U.S. Cl. ............... 350/96.34; 501/37; 501/77; 501/900
[58] Field of Search ............... 350/96.34; 106/47 Q, 106/47 R, 50

[56] References Cited

U.S. PATENT DOCUMENTS 3,778,132 12/1973 Pinnow et al. .
3,989,350 11/1976 Cohen et al. .
4,127,415 11/1978 Quachenbush et al. ............ 106/47 Q
4,217,027 8/1980 MacChesney et al. ............ 350/96.3

FOREIGN PATENT DOCUMENTS 649511 1/1951 United Kingdom ............ 106/47 Q

Primary Examiner—Alfred E. Smith
Assistant Examiner—T. N. Grigsby
Attorney, Agent, or Firm—Samuel H. Dworetsky

[57] ABSTRACT

Aluminum metaphosphate optical fibers are disclosed. In a specific embodiment, aluminum metaphosphate, doped with from 10 to 30 mole percent of diboron trioxide, is found to yield an optical fiber which combines the desirable properties of both high numerical aperture and low material dispersion. The fiber is nonhygroscopic and has a high melting temperature. The index of refraction of the glass may be lowered by doping with silicon dioxide. Consequently, a graded fiber may be made by increasing the concentration of silicon oxide from the core to the cladding.

9 Claims, 7 Drawing Figures

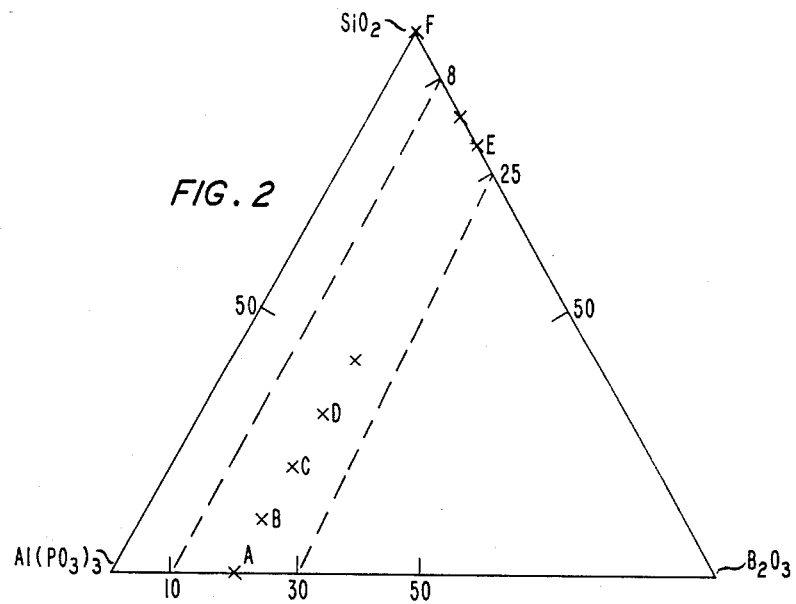
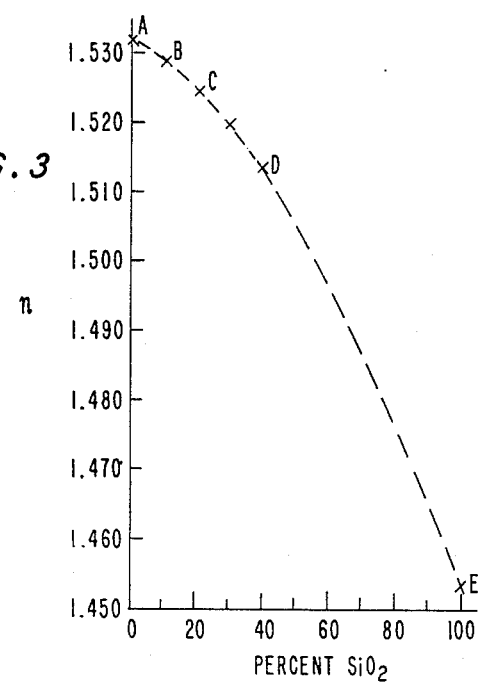

ALUMINUM METAPHOSPHATE OPTICAL FIBERS

BACKGROUND OF THE INVENTION

1. Field of the Invention

This invention involves optical fibers.

2. Description of the Prior Art

Optical fiber fabrication technology has advanced sufficiently far so that at the present time sophisticated engineering designs can be reduced to specific embodiments utilizing available fabrication processes. Both single mode and multimode fibers of very low loss are currently fabricated as a matter of course. In addition, mode dispersion in multimode fibers can be minimized by fabricating fibers with a radially graded index of refraction.

Despite the large strides that have been made in optical fiber fabrication technology, certain design parameters still remain unrealized because of limitations in either the fabrication process of the properties of the material used. One such area in which significant effort is still being applied involves the fabrication of optical fibers with high numerical aperture (N.A.). Such fibers require a core whose index of refraction is significantly greater than that of the cladding. However, materials with high enough index of refraction to be used in high N.A. fibers are most often found to have deleterious shorcomings in other areas; for example, they cannot be easily graded; they are hygroscopic; they melt at low temperatures; or they display high material dispersion.

SUMMARY OF THE INVENTION

This invention is an aluminum metaphosphate based optical fiber. The fiber comprises a core of aluminum metaphosphate, which, in a specific embodiment, is doped with from 10 to 30 mole percent diboron trioxide. An exemplary cladding consists of aluminum metaphosphate diborontrioxide doped with silicon dioxide. The fiber of such an embodiment has high numerical aperture, low material dispersion and high chemical durability, allowing for the transmission of high optical powers at high bandwidths. Fibers with numerical aperture of 0.48, and material dispersion lower than that measured in $SiO_2$ have been fabricated using such materials.

BRIEF DESCRIPTION OF THE DRAWING

FIG. 1 is a schematic representation of the inventive fiber.

FIG. 2 is a compositional diagram indicating compositions which may be utilized in the inventive fiber.

FIG. 3 shows the behavior of the index of refraction of the diboron trioxide doped aluminum metaphosphate glass as silicon dioxide is added to the glass.

DETAILED DESCRIPTION OF THE DRAWING

Figure 4:
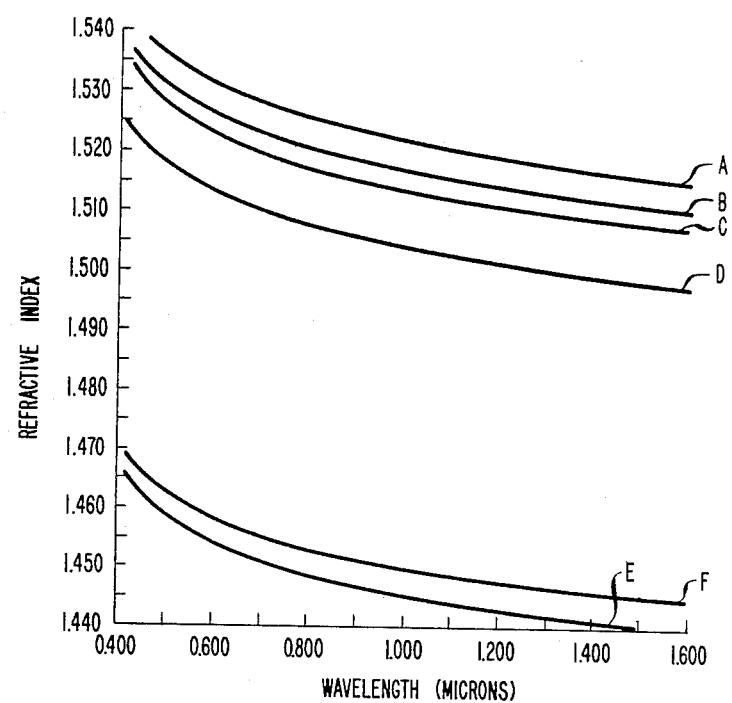
FIG. 4 is a plot of the refractive index of the glass versus wavelength for various inventive compositions.

The invention is an optical fiber based upon the ternary system aluminum metaphosphate diboron tiroxide silicon dioxide. (The various compositions may vary from perfect stoichiometry, and variations of as much as 5 molar percent from perfect stoichiometry, if not more, are contemplated within the scope of this invention.) The glass is found to have a high index of refraction, while at the same time having low material dispersion. Higher concentrations of silicon dioxide lower the index of refraction of the glass. High numerical aperture fibers, i.e., with relatively large differences in index of refraction between the core and the cladding, may be made from this glass by fabricating a core that has low or zero concentration of silicon oxide and a cladding with higher concentrations of silicon oxide.

The properties of the inventive fiber can only be appreciated with an understanding of the effects that dispersion and refraction have on a fiber's transmission capability.

The refractive properties of a fiber determine, in the first instance, whether it will guide light, as well as its numerical aperture. The numerical aperture of the fiber, in turn, determines the solid angle over which the fiber can effectively receive light and transmit it. The numerical aperture varies directly with the difference in index of refraction between the core and the cladding. Consequently, in fabricating fibers with high numerical aperture, glass compositions which can be fabricated with large variations in index of refraction are desirable. The index of refraction of the composition is altered, either raised or lowered, by changing the amount of one or more constituents of the composition. However, under most circumstances, increased index of refraction, required for high N. A. fibers, is associated with deleteriously high material dispersion, in part because the added elements, necessry to increase the index, complicate the interaction between the material and the light.

The dispersive characteristics of a fiber are critical to its ultimate information carrying capacity. Transmission of an optical pulse through a highly dispersive fiber will result in significant broadening in the temporal extent of the pulse. Consequently, only a limited number of pulses could be transmitted along such a fiber without pulses overlapping, thereby limiting the information capacity of the fiber. Dispersive effects can be traced to material limitations—under which conditions they are referred to as material dispersion—or to required compositional variations in multimode fibers—under which conditions they are referred to as mode dispersion.

The material dispersion of a fiber must be carefully distinguished from the mode dispersion associated with a multimode fiber. The mode dispersion of a multimode fiber is due to the fact that the light is transmitted at different velocities depending upon the mode in which it is transmitted. The velocity of each mode is determined by the spatial configuration of the mode and the composition of the fiber in that region where the mode is prevalent. Material dispersion, however, is due to the fact that the index of refraction of the glass is different for different wavelengths. A pulse of light transmitted through the fiber may be viewed mathematically as the sum of a Fourier series of a number of different wavelengths of light. If the index of refraction and hence the velocity with which the light is transmitted through the fiber is different for different wavelengths, then the different Fourier components of the pulse will be transmitted at different velocities. Hence, with time, the pulse will lose its temporal definition and will broaden.

It may be seen from the above discussion that the material dispersion will be minimized at that point at which the index of refraction is approximately independent of wavelength. For optical fibers, this occurs approximately midway between the U.V. electronic absorption peaks and the infrared vibrational absorption peaks. The low dispersion of the inventive fiber discussed here is believed due to the relatively low atomic weight of the aluminum and boron consitituents of the glass. These low masses shift the vibrational constant of the associated molecular system towards the U.V. Consequently, the point of zero material dispersion also shifts to shorter wavelengths and appears near the visible region, of interest in optical fiber application.

The inventive fiber is shown schematically in FIG. 1, which, in an exemplary embodiment, has a radially graded index of refraction. The fiber, 13, comprises a core, 11. The core comprises aluminum metaphosphate doped, in an exemplary embodiment, with from 10 to 30 percent diboron trioxide. The cladding consists of a glass with a lower index of refraction. Such exemplary glasses include silicon dioxide, diboron trioxide or silicon dioxide doped with from 10 to 20 mole percent diboron trioxide, all of which are found to have lower indices of refraction than the core material described above. While any of the above mentioned glasses can be used as a cladding, the fabrication process will be significantly simplified if the cladding comprises the core material doped with sufficient silicon dioxide to lower the index of refraction to a predetermined required value. A specific embodiment then comprises a core of high index of refraction and a cladding of a low index of refraction, but both with similar constituents. The core and/or the cladding may be graded in the radial direction to lower the mode dispersion. Such grading is most easily accomplished with the inventive composition by adding additional silicon dioxide to the boron doped aluminum metaphosphate, as discussed above.

In a graded multimode fiber, the cladding may have less clearly defined spatial boundaries than in a single mode fiber. In such multimode fibers, grading may extend from the center of the "core" to the periphery of the cladding with or without the addition of new elements at various points along the radius. In the inventive fiber, for example, the gradation may extend from a ternary core to pure borosilicate at the periphery of the "claddng."

An advantage that accures from the use of the herein disclosed composition in graded fibers involves the relatively small variation in coefficient of expansion as the composition is varied. In prior art fibers, such as for example, those of germanium silicate, high N. A. configurations may result in a coefficient of expansion which varies by a factor of ten across the fiber. Other fibers such as those made of germania borosilicate may have lower coefficient of expansion variations, but cannot attain the N. A.'s obtained in the fibers disclosed here. The inventive fibers disclosed here may have a coefficient of expansion which varies by as little as a factor of two as the composition is varied to grade the fiber.

The inventive glass compositions are shown schematically in FIG. 2. In this Figure, the amount of aluminum metaphosphate, diboron trioxide and silicon dioxide in the glass are shown in a triangular plot. Six specific compositions on which extensive measurements were made are indicated by the letters "A" through "F". As shown in the Figure, an exemplary inventive fiber comprises aluminum metaphosphate doped with from 10 to 30 mole percent diboron trioxide. Alternative embodiments comprise aluminum metaphosphate doped with from 15 to 25 mole percent diboron trioxide. The index of refraction of the glass may be lowered by adding silicon dioxide and this ternary system is also displayed in the figure. As additional silicon oxide is added, it is found advantageous to lower the amount of boron oxide. FIG. 3 shows how the index of refraction of the aluminum metaphosphate diboron trioxide system may be lowered by adding silicon dioxide to the glass.

The compositions which form the data points of FIGS. 2 and 3 may be formed by mixing reagent grade powdered silicon oxide, boron oxide and aluminum metaphosphate in acetone while stirring to prevent preferential separating of the powder. The mixture is dried overnight at 200 degrees C. and is then prefired at 1400 degrees C. for half an hour in an iridium crucible. The resultant material is placed in a furnace at 1600 degrees in an air atmosphere and melted. The material is stirred several times during melting and firing to ensure homogeneity. Subsequent to the melting, the material is poured in a stainless steel mold and slowly cooled to room temperature. The index of refraction and material dispersion measurements are made using techniques well known in the art.

FIG. 4 is a plot of the refractive index of the various compositions described in FIGS. 2 and 3 as a function of wavelength. The fact that composition E has an index of refraction lower than that of pure silica may be attributed to the index affecting properties of the boron dopant. This effect forms the subject of a commonly assigned patent (U.S. Pat. No. 3,778,132).

Figure 5:
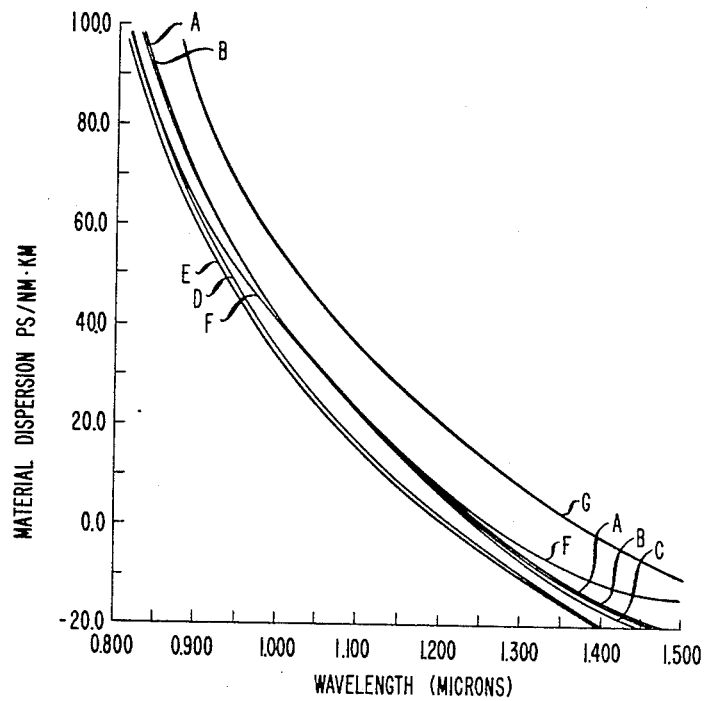
FIG. 5 is a plot of the material dispersion of the glass as a function of wavelength for various inventive compositions.

FIG. 5 is a plot of the material dispersion of the various glass compositions of FIGS. 2-4 as a function of wavelength. A specific inventive embodiment involves a fiber with both low material dispersion and high numerical aperture. For example, a fiber with a core of composition A and a cladding of composition E will have a numerical aperture of 0.48, whereas a typical prior art fiber with a core of composition G and a cladding of composition E will have a numerical aperture of 0.22. Consequently, the inventive higher N.A. fiber is seen to have a lower material dispersion than a lower N.A. prior art fiber. The specific embodiment simultaneously combines the advantageous characteristics of high N.A. and low material dispersion. Specific embodiments include fibers with N.A.'s greater than 0.3 and material dispersion less than 0.07 nanoseconds/nanometer-kilometer at 0.9 microns as well as fibers with N.A.'s between 0.3 and 0.5 and material dispersion less than 0.07 nanoseconds/nanometer-kilometer at 0.9 microns.

The significance of low material dispersion has recently become heightened in view of the fact that mode dispersion in radially graded fibers can now be lowered by appropriate grading to approximately 1-2 nanoseconds per kilometer. In prior art germania-silica fibers, material dispersion of 100 picoseconds per nanometer-kilometer at 0.9 microns yield a 3 nanosecond per kilometer dispersion when a light-emitting diode with a 30 nanometer bandwidth is used. Clearly, in such a case, the material dispersion is greater than the mode dispersion and becomes the limiting factor in determining the fiber's bandwidth. As fiber technology advances and even lower mode dispersions are attained, the need for low material dispersion fibers will become even greater. The inventive aluminum metaphosphate fibers have a material dispersion of approximately 60 picoseconds per nanometer-kilometer at 0.9 microns, as seen from FIG. 5, and consequently, for a light-emitting diode with a 30 nanometer bandwidth, the inventive fiber has a material dispersion approximately equal to the best attainable mode dispersion. Consequently, unlike the prior art fibers, the inventive fiber is not material-dispersion limited. This advantage of the inventive fiber is still further heightened when one compares it to prior art fibers with the higher N.A.'s of the present fiber, but which have much worse material dispersion.

Figure 6:
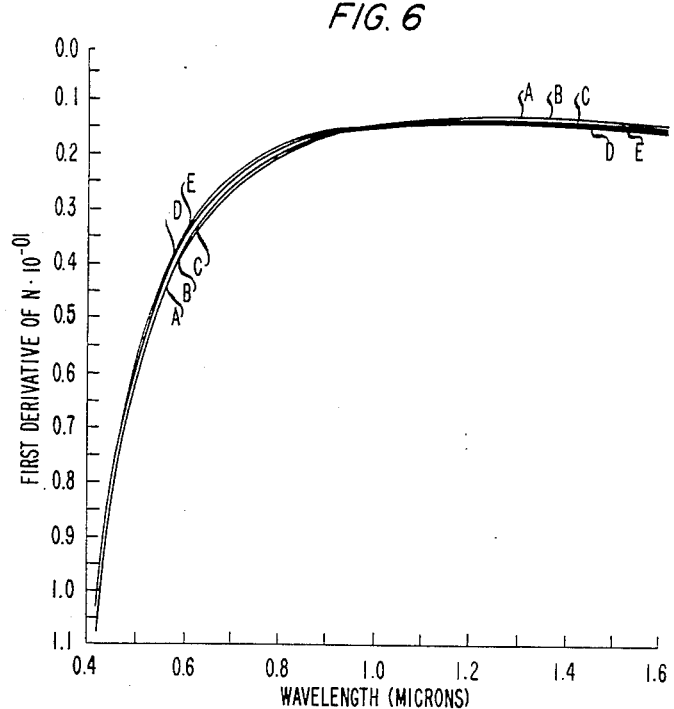
FIG. 6 is a plot of the first derivative of the index of refraction as a function of a wavelength for various inventive compositions.
Figure 7:
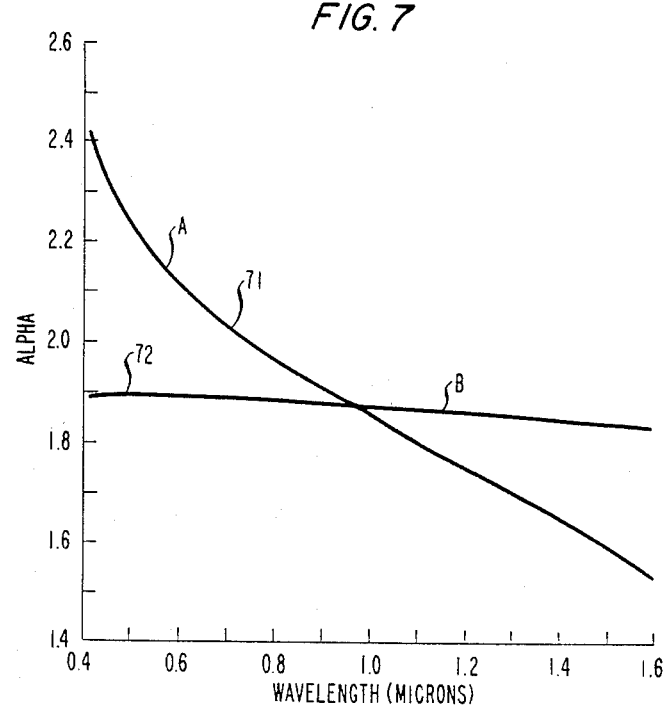
FIG. 7 is a plot of alpha, related to the optimum grading profile, as a function of wavelength, for an inventive composition as well as for a prior art fiber.

FIG. 6 is a plot of the first derivative of index of refraction as a function of wavelength for the various inventive compositions. This particular quantity is of interest, since it enters into the calculation of the optimum radial gradation, for minimizing mode dispersion, discussed in the prior art and governed by the widely referred to constant alpha (See, e.g., U.S. Pat. No. 3,989,350). Since the fabrication of a graded fiber involves the use of many different compositions, each of whose index of refraction displays a different wavelength dependence, alpha itself may vary with wavelength in prior art fibers. However, in the inventive compositions, since the first derivative of index of refraction is approximately the same for all glass compositions, alpha is found to be independent of wavelength, as shown in FIG. 7. This is to be compared with composition A in FIG. 7, which is a germanium silica graded fiber with numerical aperture of 0.22 and which is found to have an alpha which varies significantly with wavelength. As a result, the germanium silica fiber has minimized mode dispersion only at a single wavelength, whereas the alpha of the inventive fiber may be designed to have an optimum value essentially independent of wavelength.

EXAMPLE

The fiber fabrication process envisioned in this invention may be essentially identical to those used with previous materials. The aluminum may be obtained from trimethylalumina. Although this material is found to ignite when exposed to oxygen, it may be contained in an oxygen-free cylinder in liquid form, and extracted by bubbling an inert carrier gas through the cylinder to vaporize the liquid. An alternative supply of aluminum in vapor form may be obtained from aluminum trichloride which sublimates from a condensed phase. The phosphorous is obtained, according to techniques well known in the art, from $POCl_3$. The appropriate glass precursor vapors are then reacted by prior art processes, such as the exemplary MCVD process (U.S. Patent Application Ser. No. 828,617 now U.S. Pat. No. 4,217,027) or hydrolysis processes, to form an appropriate glass optical fiber preform which is then drawn into an optical fiber.

Alternate fabrication processes may take advantage of the older bulk glass fiber fabrication technology. So, for example, an aluminum metaphosphate rod may be fabricated from bulk glass and coated with an exemplary borosilicate cladding using the exemplary hydrolysis process. Alternatively, the preform may be made using the older rod and tube technique wherein a rod and tube of appropriate compositions are nested and the tube is collapsed over the rod. In a third alternative fabrication process, bulk glass of appropriate compositions may be formed into a fiber using the known double crucible technique. The formation of the bulk glass may proceed as discussed in conjunction with the compositions shown in FIGS. 2-4.

What is claimed is:

1. An optical fiber comprising a core and a cladding, the said fiber comprising aluminum metaphosphate, and in which fiber the molar ratio of aluminum to phosphorus is given substantially by the formula $Al(PO_3)_3$.

2. The fiber of claim 1 wherein the core is doped with from 10 to 30 molar percent diboron trioxide.

3. The fiber of claim 1 wherein the core is further doped with silicon dioxide.

4. The fiber of claim 2 or 3 wherein the index of refraction of the core is radially graded.

5. The fiber of claims 1, 2 or 3 further comprising a cladding comprising silicon dioxide.

6. The fiber of claim 5 wherein the cladding futher comprises diboron trioxide.

7. The fiber of claim 5 wherein the cladding further comprises aluminum metaphosphate.

8. The fiber of claims 1, 2 or 3 further comprising a cladding comprising diboron trioxide.

9. The fiber of claims 1, 2 or 3 further comprising a cladding comprising aluminum metaphosphate, diboron trioxide and silicon dioxide.

* * * * *